(12) United States Patent
Gross et al.

(10) Patent No.: US 12,371,362 B2
(45) Date of Patent: Jul. 29, 2025

(54) GLASS COMPOSITIONS FOR USE IN CO-FORMED LAMINATES

(71) Applicant: CORNING INCORPORATED, Corning, NY (US)

(72) Inventors: Timothy Michael Gross, Corning, NY (US); Jeffrey Todd Kohli, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 1055 days.

(21) Appl. No.: 17/270,759

(22) PCT Filed: Aug. 21, 2019

(86) PCT No.: PCT/US2019/047444
§ 371 (c)(1),
(2) Date: Feb. 23, 2021

(87) PCT Pub. No.: WO2020/046668
PCT Pub. Date: Mar. 5, 2020

(65) Prior Publication Data
US 2021/0179472 A1 Jun. 17, 2021

Related U.S. Application Data (60) Provisional application No. 62/724,823, filed on Aug. 30, 2018.

(51) Int. Cl.
*C03B 23/025* (2006.01)
*B32B 17/10* (2006.01)
(Continued)

(52) U.S. Cl.
CPC .... *C03B 23/0252* (2013.01); *B32B 17/10119* (2013.01); *B32B 17/10137* (2013.01);
(Continued)

(58) Field of Classification Search
CPC .......... C03B 23/0252; B32B 17/10119; B32B 17/10137; B32B 2307/732;
(Continued)

(56) References Cited

U.S. PATENT DOCUMENTS 9,375,300 B2  6/2016 Matov et al.
2015/0037586 A1  2/2015 Gross
(Continued)

FOREIGN PATENT DOCUMENTS

CN  104755265 A  7/2015
CN  107108332 A  8/2017
(Continued)

OTHER PUBLICATIONS

International Search Report and Written Opinion of the International Searching Authority; PCT/US2019/047444; mailed on Nov. 20, 2019, 9 pages; European Patent Office.
(Continued)

*Primary Examiner* — Alicia J Weydemeyer
*Assistant Examiner* — Laura B Figg
(74) *Attorney, Agent, or Firm* — William M. Johnson; Payal A. Patel; Kevin M. Able (57) ABSTRACT

Embodiments of a method for pair bending glass articles is provided herein. In the method, a first glass article and a second glass article are stacked to form a stack. The first glass article includes a first surface, a second surface that opposes the first surface, and a first composition having first annealing and softening temperatures. The second glass article includes a third surface, a fourth surface that opposes the third surface, and a second composition having second annealing and softening temperatures. The annealing temperatures are within 35° C. of each other and are at least 550° C. The softening temperatures are within 35° C. of each other and are at least 750° C. In the method, the stack is
(Continued)

placed on a mold, and the stack is heated to a sagging temperature such that a shaped stack is formed.

28 Claims, 6 Drawing Sheets

(51) Int. Cl.
*C03C 3/083* (2006.01)
*C03C 21/00* (2006.01)
(52) U.S. Cl.
CPC ............ *C03C 3/083* (2013.01); *C03C 21/002* (2013.01); *B32B 2307/732* (2013.01); *B32B 2315/08* (2013.01); *B32B 2605/00* (2013.01)
(58) Field of Classification Search
CPC . B32B 2315/08; B32B 2605/00; C03C 3/083; C03C 21/002
See application file for complete search history.

(56) References Cited

U.S. PATENT DOCUMENTS

| | | |
|---|---|---|
| 2015/0314571 A1 | 11/2015 | Cites et al. |
| 2016/0257094 A1 | 9/2016 | Lestringant et al. |
| 2018/0141850 A1 | 5/2018 | Dejneka et al. |
| 2018/0148368 A1 | 5/2018 | Gomez et al. |
| 2018/0148369 A1* | 5/2018 | Gross ................ B32B 17/10743 |
| 2018/0237326 A1* | 8/2018 | Fredholm ............ C03B 23/0252 |
| 2018/0362390 A1 | 12/2018 | Claireaux et al. |

FOREIGN PATENT DOCUMENTS

| | | |
|---|---|---|
| GB | 2078169 A | 1/1982 |
| JP | 57-160925 A | 10/1982 |
| JP | 2003-055007 A | 2/2003 |
| JP | 2017-500261 A | 1/2017 |
| JP | 2017-520496 A | 7/2017 |
| KR | 10-2018-0080473 A | 7/2018 |
| WO | 2012/137742 A1 | 10/2012 |
| WO | 2014/054468 A1 | 4/2014 |
| WO | 2018/114956 A1 | 6/2018 |
| WO | 2019/069628 A1 | 4/2019 |

OTHER PUBLICATIONS

Japanese Patent Application No. 2021-510734, Office Action, dated Jul. 26, 2023, 8 pages (4 pages of English Translation and 4 pages of Original Copy); Japanese Patent Office.

Chinese Patent Application No. 201980057025.6, Office Action, dated Aug. 2, 2022, 23 pages, (12 pages of English Translation and 11 pages of Original Copy); Chinese Patent Office.

* cited by examiner

GLASS COMPOSITIONS FOR USE IN CO-FORMED LAMINATES

CROSS-REFERENCE TO RELATED APPLICATIONS

This application is a national stage application under 35 U.S.C. § 371 of International Application No. PCT/US2019/047444, filed on Aug. 21, 2019, which claims the benefit of priority under 35 U.S.C. § 119 of U.S. Provisional Application Ser. No. 62/724,823 filed on Aug. 30, 2018 the content of which is relied upon and incorporated herein by reference in its entirety.

BACKGROUND

The disclosure relates generally to forming a curved glass laminate article, and specifically to properties of glass articles conducive to co-forming (e.g., co-sagging or pair-bending) such glass laminate articles. Curved glass laminate plies or articles find use in many applications, particularly as for vehicle or automotive window glass. Typically, curved glass plies for such applications have been formed from relatively thick plies of glass material. To improve shape consistency between individual glass plies of the laminate article, the glass materials may be shaped to the desired shape/curvature via a co-forming process, such as a co-sagging process. Applicant has found that certain properties influence the temperature at which a glass article will sag and that differences in these properties arising from different compositions, thicknesses, etc. can lead to shape mismatch between the glass articles after co-forming.

SUMMARY

In one aspect, embodiments of the disclosure relate to a method for pair bending glass articles. In the method, a first glass article and a second glass article are stacked to form a stack. The first glass article includes a first major surface, a second major surface that opposes the major first surface, and a first glass composition having a first annealing temperature and a first softening temperature. The second glass article includes a third major surface, a fourth major surface that opposes the third surface, and a second glass composition having a second annealing temperature and a second softening temperature. The first annealing temperature is within 35° C. of the second annealing temperature, and both the first annealing temperature and the second annealing temperature are at least 550° C. The first softening temperature is within 35° C. of the second softening temperature, and both the first softening temperature and the second softening temperature are at least 750° C. Further, the second major surface faces the third major surface in the stack. In the method, the stack is placed on a mold, and the stack is heated to a sagging temperature such that a shaped stack is formed. The sagging temperature is above both of the first annealing temperature and the second annealing temperature.

In another aspect, embodiments of the disclosure relate to a laminate. The laminate includes a first curved glass layer, a second curved glass layer, and an interlayer. The first curved glass layer includes a first major surface, a second major surface opposing the first major surface, a first thickness defined as the distance between the first major surface and second major surface, and a first sag depth of about 2 mm or greater. Further, the first curved glass layer has a first glass composition having a first annealing temperature and a first softening temperature. The second curved glass layer includes a third major surface, a fourth major surface opposing the third major surface, a second thickness defined as the distance between the third major surface and the fourth major surface, and a second sag depth of about 2 mm or greater. Further, the second curved glass layer has a second glass composition having a second annealing temperature and a second softening temperature. The interlayer is disposed between the second major surface of the first curved glass layer and the third major surface of the second curved glass layer. The first annealing temperature is within 35° C. of the second annealing temperature, and the first annealing temperature and the second annealing temperature are both above 550° C. The first softening temperature is within 35° C. of the second softening temperature, and the first softening temperature and the second softening temperature are both above 750° C. Additionally, at least one of the first curved glass layer and the second curved glass layer is strengthened.

In still another aspect, embodiments of the disclosure relate to a laminate. The laminate includes a first glass layer, a second glass layer, and an interlayer. The first glass layer includes a first major surface, a second major surface opposing the first major surface, and a first thickness defined as the distance between the first major surface and second major surface. Further, the first curved glass layer is made of a first glass composition having a first annealing temperature ($AT_1$) and a first softening temperature ($ST_1$). The second glass layer includes a third major surface, a fourth major surface opposing the third major surface, and a second thickness defined as the distance between the third major surface and the fourth major surface. The second curved glass layer is made of a second glass composition having a second annealing temperature ($AT_2$) and a second softening temperature ($ST_2$). The interlayer is disposed between the second major surface of the first curved glass layer and the third major surface of the second curved glass layer. Further, $(AT_1+ST_1)/2$ is within 35° C. of $(AT_2+ST_2)/2$, and the first curved glass layer is ion-exchange strengthened. The first thickness is less than the second thickness.

In yet another aspect, embodiments of the disclosure relate to a laminate. The laminate includes a first glass layer, a second glass layer, and an interlayer. The first glass layer includes a first major surface, a second major surface opposing the first major surface, and a first thickness defined as the distance between the first major surface and second major surface. Further, the first curved glass layer is made of a first glass composition having a first annealing temperature ($AT_1$) and a first softening temperature ($ST_1$). The second glass layer includes a third major surface, a fourth major surface opposing the third major surface, and a second thickness defined as the distance between the third major surface and the fourth major surface. The second curved glass layer is made of a second glass composition having a second annealing temperature ($AT_2$) and a second softening temperature ($ST_2$). The interlayer is disposed between the second major surface of the first curved glass layer and the third major surface of the second curved glass layer. Further, $(AT_1+ST_1)/2$ is within 35° C. of $(AT_2+ST_2)/2$, and both the first curved glass layer and the second curved glass layer are ion-exchange strengthened. The first thickness is less than the second thickness.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of a system and method for shaping, bending, or sagging a stack of glass plies for formation of a curved, glass laminate article are shown and described. In general, conventional processes for forming curved, laminated glass articles involve heating a pair of stacked glass plates or plies on a forming ring at a sagging temperature of the glass until the glass has sagged to the desired shape and depth. Often, the stacked glass plies include one relatively thicker glass ply (i.e., first glass ply) of soda lime glass (SLG), especially for automotive glazing applications, and one relatively thinner glass ply (i.e., second glass ply) of a strengthened or strengthenable glass, which generally has a different composition than SLG. Because of the difference in composition, thickness, and associated viscosities, shape mismatches and optical distortions can arise during the co-forming process (e.g., co-sagging or pair bending) Previous attempts to address this issue tended to focus attention on changing the viscosity curve of the thinner, strengthenable glass ply to match those of the SLG ply. However, this also tended to decrease the strengthening properties of the thinner, strengthenable glass ply or to increase the cost and time involved in the strengthening process, such as an ion-exchange process. According to the present disclosure, however, the SLG composition of the relatively thicker glass ply is modified or entirely changed to move the viscosity curve of the thicker ply towards those of the thinner ply.

More specifically, according to the present disclosure, the relatively thick SLG ply in a laminated glazing product is replaced with another glass composition that has a viscosity curve closer to that of relatively thinner, strengthened glass ply. That is, the SLG replacement ply is selected such that the softening, annealing, strain, and/or co-sagging temperatures differ from those respective temperatures of the strengthenable glass ply by 35° C. or less. Further, in embodiments, the SLG-replacement ply has a softening point above 750° C. and an annealing point above 550° C. These and other embodiments will be described more fully below. Such embodiments are provided by way of example and not by way of limitation.

Figure 6:
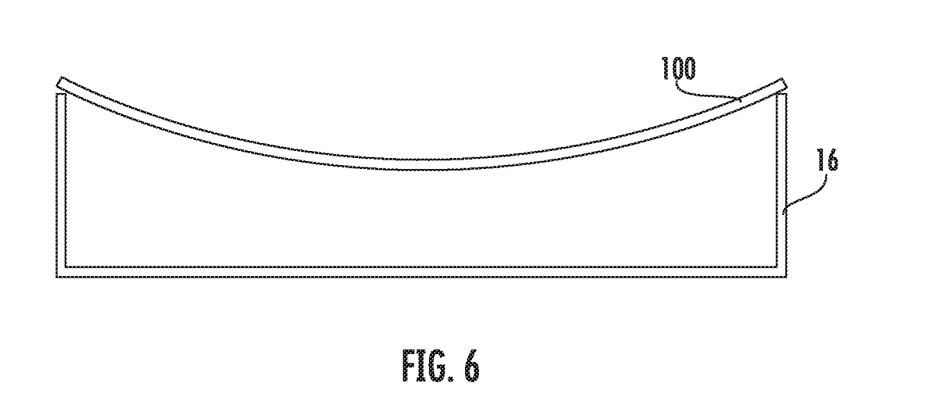
FIG. 6 illustrates the degree of sagging experienced by a relatively thick glass ply within a heating station.
Figure 7:
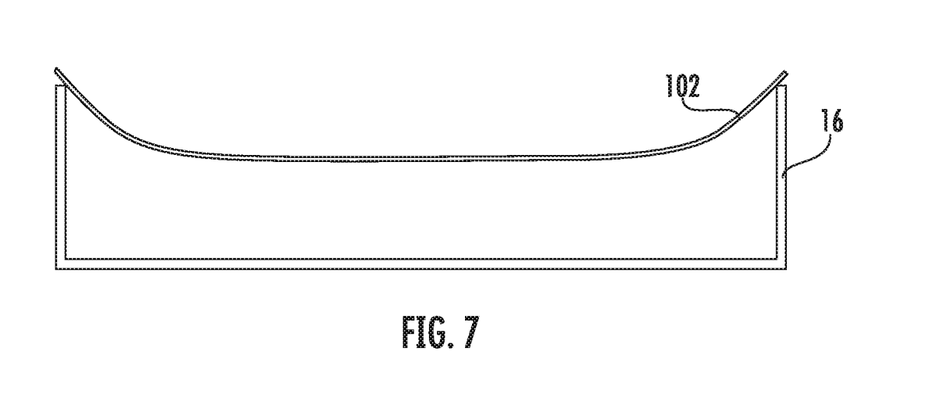
FIG. 7 illustrates the degree of sagging experienced by a relatively thin glass ply within a heating station.

As shown in FIG. 6, when a ply of glass is sagged under gravity by itself, a thicker glass ply 100 will produce a more parabolic shape. While, as shown in FIG. 7, a thinner glass ply 102 will produce a "bath tub" like shape where curvature is greatest near the edges and is reduced near the center. As a result, when the two plies are co-sagged, a shape mismatch develops between the glass plies. Further, contact pressure is increased near the edges when a thin ply is sagged on top of a thick ply, and contact pressure is increased near the center when a thick ply is sagged on top of a thin ply. This increase in contact pressure is thought to contribute to the creation of bending dot defects through increasing imprintation of the separation material particles into the glass surfaces. Thus, as will be understood, the difference in sag shape illustrated in FIGS. 6 and 7 generally will increase as the thickness difference and the viscosity difference between the two glass plies increases, and thus, the sensitivity to shape mismatch and bending dot formation also appears to increases as the thickness difference and the viscosity difference between the two glass plies increases.

Figure 1:
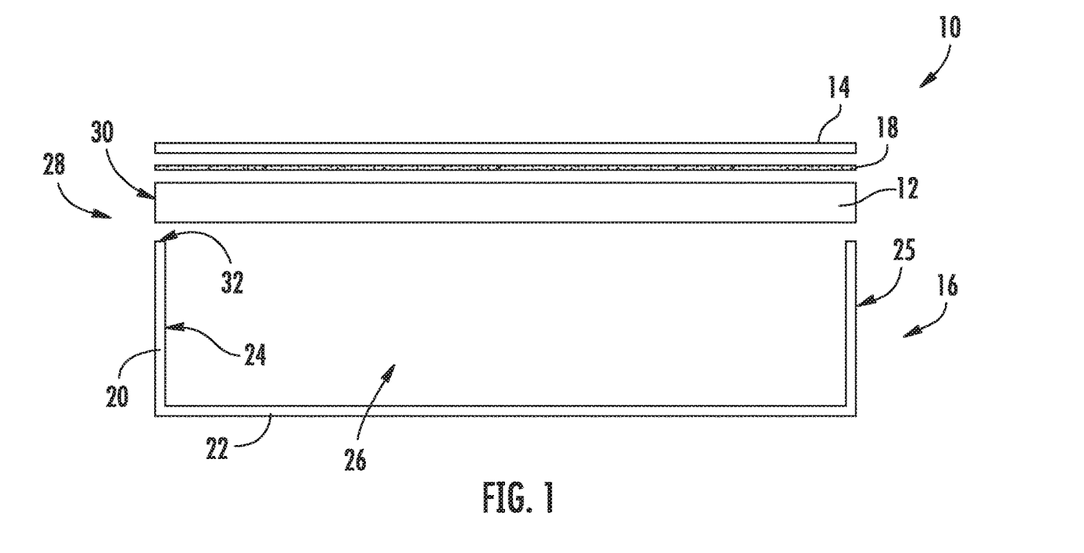
FIG. 1 is a schematic, cross-sectional view showing stacking of glass plies for co-sagging, according to an exemplary embodiment.
Figure 2:
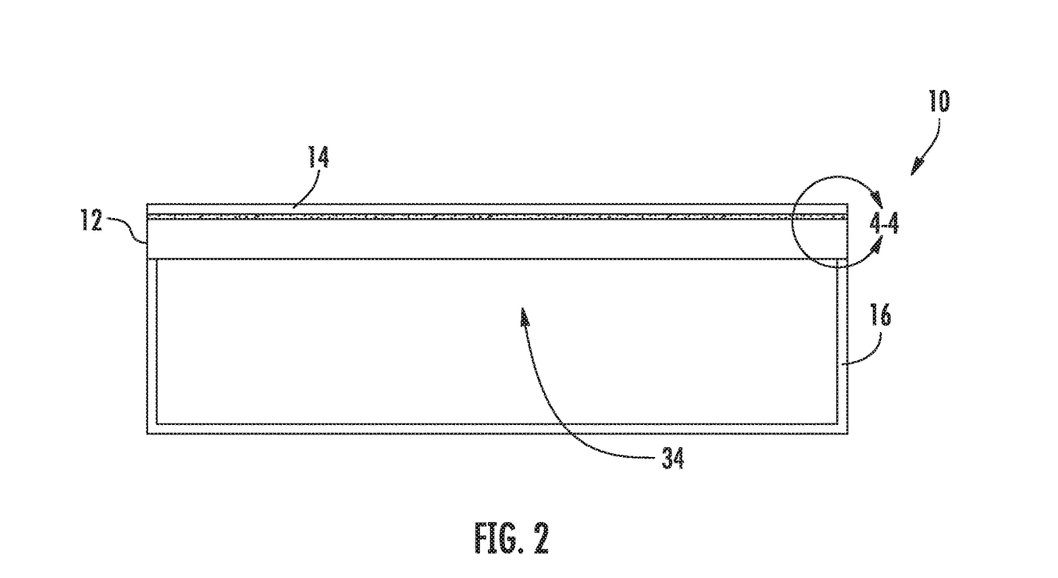
FIG. 2 is a schematic, cross-sectional view showing stacked glass plies supported on a bending ring, according to an exemplary embodiment.

Referring to FIG. 1 and FIG. 2, a system and process for forming a curved glass article is shown according to an exemplary embodiment. In general, system 10 includes one or more ply of glass material, shown as a pair of glass plies, first glass ply 12 and second glass ply 14, supported by a shaping frame, shown as bending ring 16. It should be understood that bending ring 16 may have a wide variety of shapes selected based on the shape of the glass plies to be supported, and use of the term ring does not necessarily denote a circular shape.

As shown in FIGS. 1 and 2, a separation material 18 is applied to an upper surface of lower glass ply 12. In general, separation material 18 is a material that prevents plies 12 and 14 from bonding together during the heating stages of the curve formation. As shown in FIG. 1, bending ring 16 includes a support wall, shown as sidewall 20, and a bottom wall 22. Sidewall 20 extends upward and away from bottom wall 22. The radially inward facing surface 24 of sidewall 20 defines an open central region or cavity 26, and an upward facing surface of bottom wall 22 defines the lower end of cavity 26. A radially outward facing surface 25 is opposite of inward facing surface 24.

Separation material 18 is applied to the upper surface of glass ply 12. Upper glass ply 14 is placed onto separation material 18 such that a lower surface of upper glass ply 14 is in contact with separation material 18. As can be seen in FIGS. 1 and 2, in this arrangement, separation material 18 acts as a barrier between glass plies 12 and 14 which prevents the glass plies 12 and 14 from bonding together at the high temperatures during the sagging process.

To begin the shaping process, an outer region 28 of glass ply 12 adjacent the outer perimeter edge 30 of the glass ply is placed into contact with a support surface, shown as upward facing surface 32, of bending ring 16. In this arrangement, glass plies 12 and 14 are both supported by the contact between upward facing surface 32 with glass ply 12 such that central regions 34 of glass plies 12 and 14 are supported over central cavity 26.

Figure 3:
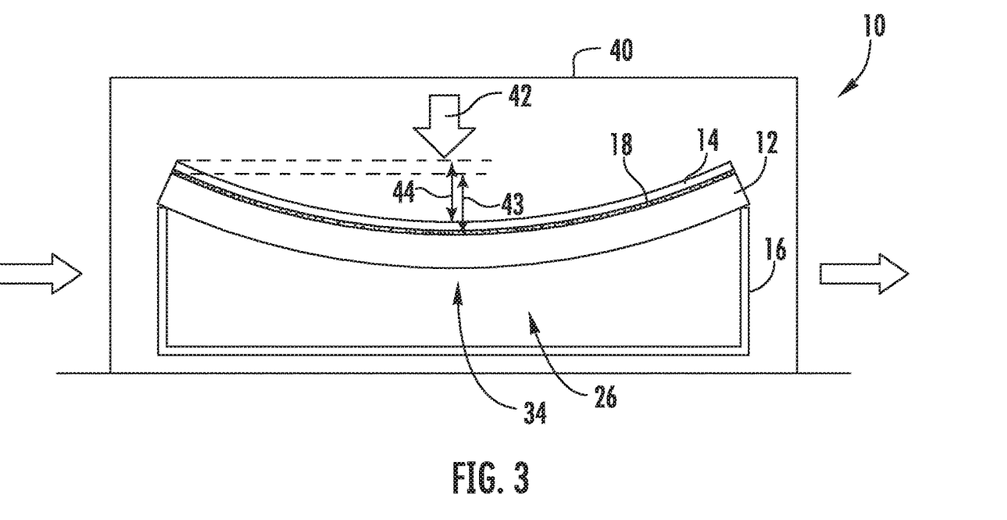
FIG. 3 is a cross-sectional view showing the stacked glass plies of FIG. 2 supported by a bending ring within a heating station, according to an exemplary embodiment.

Next, referring to FIG. 3, bending ring 16, supported glass plies 12 and 14 and separation material 18 are moved into a heating station 40, such as an oven or serial indexing lehr. Within heating station 40, glass plies 12 and 14, separation material 18 and bending ring 16 are heated (e.g., to a sagging temperature of the glass material of glass plies 12 and 14) while glass plies 12 and 14 are supported on bending ring 16. As glass plies 12 and 14 are heated, a shaping force, such as the downward force 42, causes central region 34 of glass plies 12 and 14 to deform or sag downward into central cavity 26 of bending ring 16.

In specific embodiments, the downward force is provided by gravity. In some embodiments, the downward force 42 may be provided via air pressure (e.g., creating a vacuum on the convex side of glass plies 12 and 14, blowing air on the concave side of glass plies 14, via press) or through a contact-based molding machine. Regardless of the source of the deforming force, this procedure results in glass plies 12 and 14 having a curved shape as shown in FIG. 3.

In embodiments, the curved shape defines a sag depth. As can be seen in FIG. 3, a first sag depth 43 is the deviation from planar experienced by the first glass ply 12 after sagging, and a second sag depth 44 is the deviation from planar experienced by the second glass ply 14 after sagging. In one or more embodiments, one or both the first sag depth 43 and the second sag depth 44 is about 2 mm or greater. For example, one or both the first sag depth 43 and the second sag depth 44 may be in a range from about 2 mm to about 30 mm, from about 4 mm to about 30 mm, from about 5 mm to about 30 mm, from about 6 mm to about 30 mm, from about 8 mm to about 30 mm, from about 10 mm to about 30 mm, from about 12 mm to about 30 mm, from about 14 mm to about 30 mm, from about 15 mm to about 30 mm, from about 2 mm to about 28 mm, from about 2 mm to about 26 mm, from about 2 mm to about 25 mm, from about 2 mm to about 24 mm, from about 2 mm to about 22 mm, from about 2 mm to about 20 mm, from about 2 mm to about 18 mm, from about 2 mm to about 16 mm, from about 2 mm to about 15 mm, from about 2 mm to about 14 mm, from about 2 mm to about 12 mm, from about 2 mm to about 10 mm, from about 2 mm to about 8 mm, from about 6 mm to about 20 mm, from about 8 mm to about 18 mm, from about 10 mm to about 15 mm, from about 12 mm to about 22 mm, from about 15 mm to about 25 mm, or from about 18 mm to about 22 mm.

In one or more embodiments, the first sag depth 43 and the second sag depth 44 are substantially equal to one another. In one or more embodiments, the second sag depth 44 is within 10% of the first sag depth 43. For example, the second sag depth 44 is within 9%, within 8%, within 7%, within 6% or within 5% of the second sag depth 44. For illustration, the first sag 43 depth is about 15 mm, and the second sag depth 44 is in a range from about 13.5 mm to about 16.5 mm (or within 10% of the first sag depth 43).

After a period of time determined to allow glass plies 12 and 14 to develop the desired sag depth, bending ring 16 along with the supported glass plies 12 and/or 14 are then cooled to room temperature. Thus, the shaped, deformed or curved glass plies 12 and 14 are allowed to cool, fixing glass plies 12 and 14 into the curved shape created within heating station 40. Once cooled, curved glass plies 12 and 14 are removed from bending ring 16 and another set of flat glass plies are placed onto bending ring 16, and the shaping process is repeated. Following shaping, the now curved glass plies 12 and 14 are bonded together (e.g., typically via a polymer interlayer, such as polyvinyl butyral (PVB)) into the final curved glass, laminate article.

Figure 4:
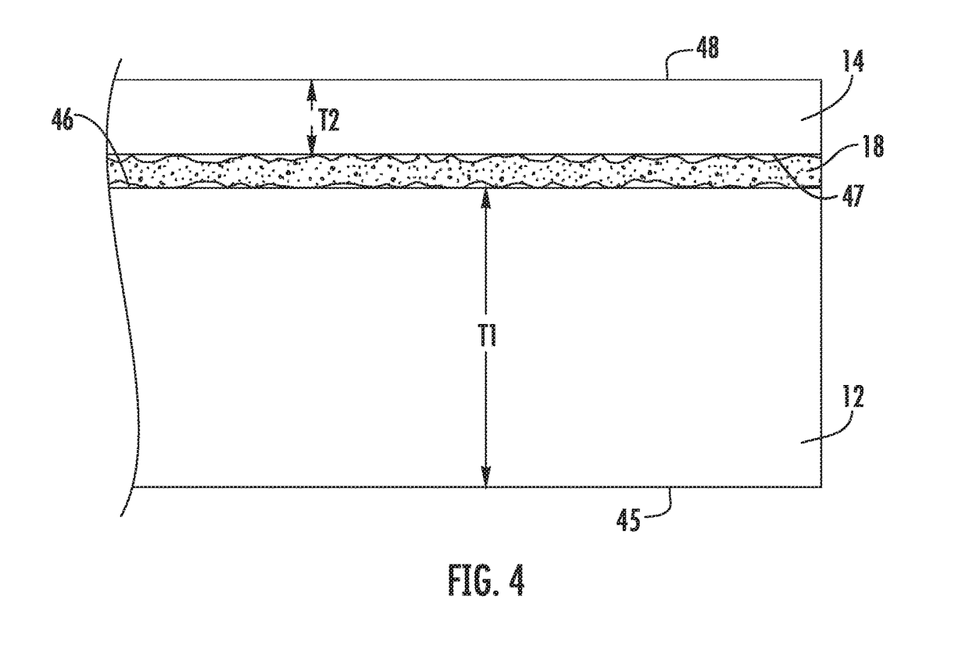
FIG. 4 is a detailed view of the stacked glass plies of FIG. 2, according to an exemplary embodiment

After the forming operation, in one or more embodiments, the first glass ply 12 and the second glass ply 14 comprise a shape deviation therebetween of ±5 mm or less as measured by an optical three-dimensional scanner such as the ATOS Triple Scan supplied by GOM GmbH, located in Braunschweig, Germany. With reference to FIG. 4, the first glass ply 12 has a first major surface 45 and a second major surface 46, and the second glass ply 14 has a third major surface 47 and a fourth major surface 48. In one or more embodiments, the shape deviation is measured between the second major surface 46 and the third major surface 47, or between the first major surface 45 and the fourth surface 48. In one or more embodiments, the shape deviation between the first glass ply 12 and the second glass ply 14 is about ±4 mm or less, about ±3 mm or less, about ±2 mm or less, about ±1 mm or less, about ±0.8 mm or less, about ±0.6 mm or less, about ±0.5 mm or less, about ±0.4 mm or less, about ±0.3 mm or less, about ±0.2 mm or less, or about ±0.1 mm or less. As used herein, the shape deviation refers to the maximum shape deviation measured on the respective surfaces.

Further, after forming, in one or more embodiments, one of or both the first major surface 45 and the fourth major surface 48 exhibit minimal optical distortion. For example, one of or both the first major surface 45 and the fourth major surface 48 exhibit optical distortion of less than about 400 millidiopters, less than about 300 millidiopters, or less than about 250 millidiopters, as measured by an optical distortion detector using transmission optics according to ASTM 1561. A suitable optical distortion detector is supplied by ISRA VISIION AG, located in Darmstadt, Germany, under the tradename SCREENSCAN-Faultfinder. In one or more embodiments, one of or both the first major surface 45 and the fourth major surface 48 exhibit optical distortion of about 190 millidiopters or less, about 180 millidiopters or less, about 170 millidiopters or less, about 160 millidiopters or less, about 150 millidiopters or less, about 140 millidiopters or less, about 130 millidiopters or less, about 120 millidiopters or less, about 110 millidiopters or less, about 100 millidiopters or less, about 90 millidiopters or less, about 80 millidiopters or less, about 70 millidiopters or less, about 60 millidiopters or less, or about 50 millidiopters or less. As used herein, the optical distortion refers to the maximum optical distortion measured on the respective surfaces.

In one or more embodiments, the first major surface 45 or the second major surface 46 of the first glass ply 12 exhibits low membrane tensile stress. Membrane tensile stress can occur during cooling of curved layers and laminates. As the glass cools, the major surfaces and edge surfaces (orthogonal to the major surfaces) can develop surface compression, which is counterbalanced by a central region exhibiting a tensile stress. Bending or shaping can introduce additional surface tension near the edge and causes the central tensile region to approach the glass surface. Accordingly, membrane tensile stress is the tensile stress measured near the edge (e.g., about 10-25 mm from the edge surface). In one or more embodiments, the membrane tensile stress at the first major surface 45 or the second major surface 46 of the first glass ply 12 is less than about 7 MPa as measured by a surface stress meter according to ASTM C1279. An example of such a surface stress meter is supplied by Strainoptic Technologies under the trademark GASP® (Grazing Angle Surface Polarimeter). In one or more embodiments, the membrane tensile stress at the first major surface 45 or the second major surface 46 of the first glass ply 12 is about 6 MPa or less, about 5 MPa or less, about 4 MPa or less, or about 3 MPa or less. In one or more embodiments, the lower limit of membrane tensile stress is about 0.01 MPa or about 0.1 MPa.

As shown in FIG. 4, the first major surface 45 and the second major surface 46 define a thickness T1 of the first glass ply 12 therebetween, and the third major surface 47 and the fourth major surface 48 define a thickness T2 of the second glass ply 14 therebetween. In one or more embodiments, either one or both the first glass ply 12 and the second glass ply 14 comprise a thickness T1 or T2 less than 1.6 mm (e.g., 1.55 mm or less, 1.5 mm or less, 1.45 mm or less, 1.4 mm or less, 1.35 mm or less, 1.3 mm or less, 1.25 mm or less, 1.2 mm or less, 1.15 mm or less, 1.1 mm or less, 1.05 mm or less, 1 mm or less, 0.95 mm or less, 0.9 mm or less, 0.85 mm or less, 0.8 mm or less, 0.75 mm or less, 0.7 mm or less, 0.65 mm or less, 0.6 mm or less, 0.55 mm or less, 0.5 mm or less, 0.45 mm or less, 0.4 mm or less, 0.35 mm or less, 0.3 mm or less, 0.25 mm or less, 0.2 mm or less, 0.15 mm or less, or about 0.1 mm or less). The lower limit of thickness T1 or T2 may be 0.1 mm, 0.2 mm or 0.3 mm. In some embodiments, the thickness T1 or T2 of either one or both of glass plies 12, 14 is in the range from about 0.1 mm to less than about 1.6 mm, from about 0.1 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1 mm, from about 0.1 mm to about 0.9 mm, from about 0.1 mm to about 0.8 mm, from about 0.1 mm to about 0.7 mm, from about 0.1 mm, from about 0.2 mm to less than about 1.6 mm, from about 0.3 mm to less than about 1.6 mm, from about 0.4 mm to less than about 1.6 mm, from about 0.5 mm to less than about 1.6 mm, from about 0.6 mm to less than about 1.6 mm, from about 0.7 mm to less than about 1.6 mm, from about 0.8 mm to less than about 1.6 mm, from about 0.9 mm to less than about 1.6 mm, from about 1 mm to about 1.6 mm, from about 0.4 mm to about 1.2 mm, from about 0.5 mm to about 1.2 mm, from about 0.7 mm to about 1.2 mm, from about 0.4 mm to about 1 mm, from about 0.5 mm to about 1 mm, or from about 0.7 mm to about 1 mm. In some embodiments, the glass plies 12, 14 have substantially the same thickness as one another (i.e., T1 T2).

In some embodiments, while one of the first and second glass plies 12, 14 has a thickness less than about 1.6 mm, the other of the first and second glass plies has a thickness that is about 1 mm or greater, or about 1.6 mm or greater. In one or more embodiments, the glass plies 12, 14 have thicknesses T1, T2 that differ from one another. For example, the while one of the glass plies 12, 14 has a thickness T1 or T2 less than about 1.6 mm, the other of the glass plies 12, 14 has a thickness T1 or T2 that is about 1.7 mm or greater, about 1.75 mm or greater, about 1.8 mm or greater, about 1.7 mm or greater, about 1.7 mm or greater, about 1.7 mm or greater, about 1.85 mm or greater, about 1.9 mm or greater, about 1.95 mm or greater, about 2 mm or greater, about 2.1 mm or greater, about 2.2 mm or greater, about 2.3 mm or greater, about 2.4 mm or greater, 2.5 mm or greater, 2.6 mm or greater, 2.7 mm or greater, 2.8 mm or greater, 2.9 mm or greater, 3 mm or greater, 3.2 mm or greater, 3.4 mm or greater, 3.5 mm or greater, 3.6 mm or greater, 3.8 mm or greater, 4 mm or greater, 4.2 mm or greater, 4.4 mm or greater, 4.6 mm or greater, 4.8 mm or greater, 5 mm or greater, 5.2 mm or greater, 5.4 mm or greater, 5.6 mm or greater, 5.8 mm or greater, or 6 mm or greater. In some embodiments the first and/or second glass plies has a thickness in a range from about 1.6 mm to about 6 mm, from about 1.7 mm to about 6 mm, from about 1.8 mm to about 6 mm, from about 1.9 mm to about 6 mm, from about 2 mm to about 6 mm, from about 2.1 mm to about 6 mm, from about 2.2 mm to about 6 mm, from about 2.3 mm to about 6 mm, from about 2.4 mm to about 6 mm, from about 2.5 mm to about 6 mm, from about 2.6 mm to about 6 mm, from about 2.8 mm to about 6 mm, from about 3 mm to about 6 mm, from about 3.2 mm to about 6 mm, from about 3.4 mm to about 6 mm, from about 3.6 mm to about 6 mm, from about 3.8 mm to about 6 mm, from about 4 mm to about 6 mm, from about 1.6 mm to about 5.8 mm, from about 1.6 mm to about 5.6 mm, from about 1.6 mm to about 5.5 mm, from about 1.6 mm to about 5.4 mm, from about 1.6 mm to about 5.2 mm, from about 1.6 mm to about 5 mm, from about 1.6 mm to about 4.8 mm, from about 1.6 mm to about 4.6 mm, from about 1.6 mm to about 4.4 mm, from about 1.6 mm to about 4.2 mm, from about 1.6 mm to about 4 mm, from about 3.8 mm to about 5.8 mm, from about 1.6 mm to about 3.6 mm, from about 1.6 mm to about 3.4 mm, from about 1.6 mm to about 3.2 mm, or from about 1.6 mm to about 3 mm.

In the embodiment shown in FIG. 4, the thicker glass ply 12 is located below the thinner glass ply 14 when stacked on bending ring 16. However, it should be understood that in other embodiments, the thinner glass ply 14 may be located below thicker glass ply 12 in the stack supported by bending ring 16.

In various embodiments, glass ply 12 is formed from a first glass material/composition, and glass ply 14 is formed from a second glass material/composition different from the first material. In embodiments, the first glass material has a viscosity that is different from the viscosity of the second glass material during heating within heating station 40. In other embodiments, the glass plies 12, 14 are formed from the same glass material/composition. However, in such embodiments, the glass plies 12, 14 may have different thicknesses. In embodiments, the glass plies 12, 14 are at least one of a modified SLG, an aluminosilicate glass, an alkali aluminiosilicate glass, an aluminoborosilicate glass, a phospho aluminoborosilicate glass, or alkali aluminoborosilicate glass.

In embodiments, the glass compositions for the glass plies 12, 14 are selected such that thermal properties are within a certain temperature range of each other. In embodiments, the strain points, anneal points, softening points, and/or co-sagging temperatures are within 35° C. In other embodiments, the strain points, anneal points, softening points, and/or co-sagging temperatures are within 25° C. In still other embodiments, the strain points, anneal points, softening points, and/or co-sagging temperatures are within 15° C. The co-sagging temperature can be defined in various ways. In embodiments, the co-sagging temperature is defined as (anneal point+softening point)/2. In such an embodiment, the co-sagging temperature of (anneal point+softening point)/2 is at least 650° C., and in other embodiments, the co-sagging temperature of (anneal point+softening point)/2 is at most 750° C. In another embodiment, the co-sagging temperature is defined as the temperature at which a specific viscosity is reached. For example, in an embodiment, the co-sagging temperature is the temperature at which the viscosity is $10^9$ to $10^{13}$ poise (referred to as temperature $T_{log9}$ to $T_{log13}$). In a particular embodiment, the co-sagging temperature is defined as the temperature at which the viscosity is $10^{12}$ poise (i.e., temperature $T_{log12}$). In embodiments, the temperature $T_{log12}$ is at least 575° C. Further, in embodiments, the glass plies 12, 14 have a composition in which the softening point is at least 750° C. In still further embodiments, the glass plies 12, 14 have a composition in which the anneal point is at least 550° C. In further embodiments, the glass plies 12, 14 have a composition in which the softening point is at most 875° C. and/or in which the anneal point is at most 625° C.

In embodiments, glass plies 12 and/or 14 are chemically strengthenable, such as through ion-exchange strengthening. In embodiments, having a chemically strengthened compression layer having a depth of layer (DOL) in a range from about 30 μm to about 90 μm, and a compressive stress on at least one of the ply's major surfaces of between 300 MPa to 1000 MPa. In some embodiments, the chemically strengthened glass is strengthened through ion exchange.

In one or more embodiments, the glass plies 12, 14 may be strengthened to include compressive stress (CS) that extends from a surface to a DOL. The surface (CS) regions are balanced by a central portion exhibiting a tensile stress (CT). At the DOL, the stress crosses from a positive (compressive) stress to a negative (tensile) stress; however compressive stress and tensile stress values provided herein are absolute values.

In one or more embodiments, the glass plies 12, 14 may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature below the glass transition point and then rapidly quenching.

In one or more embodiments, the glass plies 12, 14 may be chemically strengthened by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the glass article generate a stress. Ion exchange processes are typically carried out by immersing a glass ply 12, 14 in a molten salt bath (or two or more molten salt baths) containing the larger ions to be exchanged with the smaller ions in the glass article. It should be noted that aqueous salt baths may also be utilized. In addition, the composition of the bath(s) may include more than one type of larger ion (e.g., Na+ and K+) or a single larger ion. It will be appreciated by those skilled in the art from the present disclosure that parameters for the ion exchange process, including, but not limited to, bath composition and temperature, immersion time, the number of immersions of the glass article in a salt bath (or baths), use of multiple salt baths, additional steps such as annealing, washing, and the like, are generally determined by the composition of the glass article (including the structure of the article and any crystalline phases present) and the desired DOL and CS of the glass article that results from strengthening. Exemplary molten bath composition may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass ply thickness, bath temperature and glass (or monovalent ion) diffusivity. However, temperatures and immersion times different from those described above may also be used.

In one or more embodiments, the glass plies 12, 14 may be immersed in a molten salt bath of 100% $NaNO_3$, 100% $KNO_3$, or a combination of $NaNO_3$ and $KNO_3$ having a temperature in a range from about 370° C. to about 480° C.

In some embodiments, the glass article may be immersed in a molten mixed salt bath including from about 5% to about 90% $KNO_3$ and from about 10% to about 95% $NaNO_3$. In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass article may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass ply. The spike may result in a greater surface CS value. This spike can be achieved by single bath or multiple baths, with the bath(s) having a single composition or mixed composition, due to the unique properties of the glass compositions used in the glass articles described herein.

In one or more embodiments, where more than one monovalent ion is exchanged into the glass article, the different monovalent ions may exchange to different depths within the glass article (and generate different magnitudes stresses within the glass article at different depths). The resulting relative depths of the stress-generating ions can be determined and cause different characteristics of the stress profile.

Surface CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass article. In other embodiments, the maximum compressive stress may occur at a depth below the surface, giving the compressive profile the appearance of a "buried peak."

DOL may be measured by FSM or by a scattered light polariscope (SCALP) (such as the SCALP-04 scattered light polariscope available from Glasstress Ltd., located in Tallinn, Estonia), depending on the strengthening method and conditions. When the glass article is chemically strengthened by an ion exchange treatment, FSM or SCALP may be used depending on which ion is exchanged into the glass ply. Where the stress in the glass ply is generated by exchanging potassium ions into the glass article, FSM is used to measure DOL. Where the stress is generated by exchanging sodium ions into the glass ply, SCALP is used to measure DOL. Where the stress in the glass article is generated by exchanging both potassium and sodium ions into the glass, the DOL is measured by SCALP because it is believed the exchange depth of sodium indicates the DOL and the exchange depth of potassium ions indicates a change in the magnitude of the compressive stress (but not the change in stress from compressive to tensile); the exchange depth of potassium ions in such glass plies is measured by FSM.

In one or more embodiments, the glass article may be strengthened to exhibit a DOL that is described a fraction of the thickness T1 or T2 of the glass ply (as described herein). For ease of reference, T1 and T2 will be collectively referred to as "t" for the following discussion. For example, in one or more embodiments, the DOL may be equal to or greater than about 0.03 t, equal to or greater than about 0.05 t, equal to or greater than about 0.06 t, equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, the DOL may be in a range from about 0.03 t to about 0.25 t, from about 0.04 t to about 0.25 t, from about 0.05 t to about 0.25 t, from about 0.06 t to about 0.25 t, from about 0.07 t to about 0.25 t, from about 0.08 t to about 0.25 t, from about 0.09 t to about 0.25 t, from about 0.18 t to about 0.25 t, from about 0.11 t to about 0.25 t, from about 0.12 t to about 0.25 t, from about 0.13 t to about 0.25 t, from about 0.14 t to about 0.25 t, from about 0.15 t to about 0.25 t, from about 0.03 t to about 0.24 t, from about 0.03 t to about 0.23 t, from about 0.03 t to about 0.22 t, from about 0.03 t to about 0.21 t, from about 0.03 t to about 0.2 t, from about 0.03 t to about 0.19 t, from about 0.03 t to about 0.18 t, from about 0.03 t to about 0.17 t, from about 0.03 t to about 0.16 t, or from about 0.03 t to about 0.15 t. In some instances, the DOL may be about 20 µm or less. In one or more embodiments, the DOL may be about 35 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm).

In one or more embodiments, the strengthened glass ply may have a CS (which may be found at the surface or a depth within the glass ply) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass ply may have a maximum CT of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum CT may be in a range from about 40 MPa to about 100 MPa.

In one or more embodiments, glass plies 12 and/or 14 exhibits an average total solar transmittance of about 88% or less, over a wavelength range from about 300 nm to about 2500 nm, when glass plies 12 and/or 14 has a thickness of 0.7 mm. For example, glass plies 12 and/or 14 exhibits an average total solar transmittance in a range from about 60% to about 88%, from about 62% to about 88%, from about 64% to about 88%, from about 65% to about 88%, from about 66% to about 88%, from about 68% to about 88%, from about 70% to about 88%, from about 72% to about 88%, from about 60% to about 86%, from about 60% to about 85%, from about 60% to about 84%, from about 60% to about 82%, from about 60% to about 80%, from about 60% to about 78%, from about 60% to about 76%, from about 60% to about 75%, from about 60% to about 74%, or from about 60% to about 72%.

In one or more embodiments, glass plies 12 and/or 14 exhibit an average transmittance in the range from about 75% to about 85%, at a thickness of 0.7 mm or 1 mm, over a wavelength range from about 380 nm to about 780 nm. In some embodiments, the average transmittance at this thickness and over this wavelength range may be in a range from about 75% to about 84%, from about 75% to about 83%, from about 75% to about 82%, from about 75% to about 81%, from about 75% to about 80%, from about 76% to about 85%, from about 77% to about 85%, from about 78% to about 85%, from about 79% to about 85%, or from about 80% to about 85%. In one or more embodiments, glass plies 12 and/or 14 exhibits $T_{uv-380}$ or $T_{uv-400}$ of 50% or less (e.g., 49% or less, 48% or less, 45% or less, 40% or less, 30% or less, 25% or less, 23% or less, 20% or less, or 15% or less), at a thickness of 0.7 mm or 1 mm, over a wavelength range from about 300 nm to about 400 nm.

Figure 5:
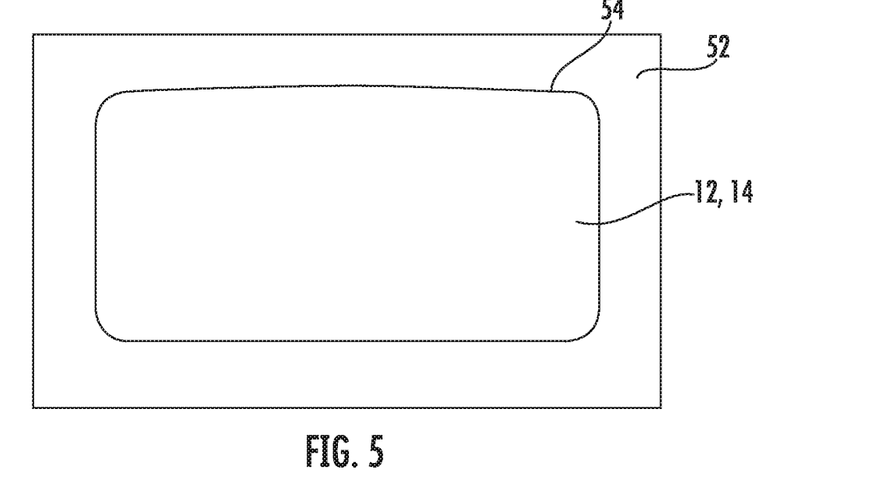
FIG. 5 is a plan view of a glass preform cut from a glass ply used to form the stacked glass plies of FIG. 2, according to an exemplary embodiment.

For completeness, additional steps for forming a glass laminate article before and after the co-sagging process are provided. Referring to FIG. 5, by way of example, glass ply 12 or 14 (also referred to as a preform) are cut from their individual stock glass plies 52. The stock glass plies 52 may be made via a variety of forming processes, such as a float process, a fusion-draw process, or an up-draw process. In general the process is selected on the basis that it yields glass with sufficient dimensional tolerances and desired properties, such as desired optical, mechanical, thermal, and/or weathering properties. Additionally, either one or both of the glass plies 12, 14 may be strengthened, such as chemically strengthened (e.g., ion-exchange strengthened) or thermally tempered, or either one or both of the glass plies 12, 14 may be used as-formed and/or annealed, without subsequent strengthening.

In various embodiments, a curved glass laminate article formed from the process and/or system discussed herein is provided. In specific embodiments, the curved glass laminate article includes plies 12 and 14 bound together by an interlayer (e.g., a polymer interlayer such as a polyvinyl butyral layer). In such embodiments, the glass laminate article formed from glass plies 12 and 14 is highly asymmetrical (e.g., has the large thickness differences and/or material property differences discussed above) while at the same time having low levels of bending dot defects and low levels of shape difference between the plies.

In various embodiments, glass plies 12 and/or 14 following curve formation may be utilized in a variety of applications. In specific embodiments, the glass laminate article produced via the systems and processes discussed herein are used to form vehicle (e.g., automotive) windows. In specific embodiments, the laminate article formed from glass plies 12 and/or 14 may form the sidelights, windshields, rear windows, windows, rearview mirrors, and sunroofs of a vehicle. As used herein, vehicle includes automobiles, rolling stock, locomotive, boats, ships, and airplanes, helicopters, drones, space craft and the like. In other embodiments, the laminate article formed from glass plies 12 and/or 14 may be used in a variety of other applications where thin, curved glass laminate articles may be advantageous, such as for architectural glass, building glass, etc.

Exemplary Combinations of Glass Compositions for Pair-Bended Glass Laminates

Figure 8:
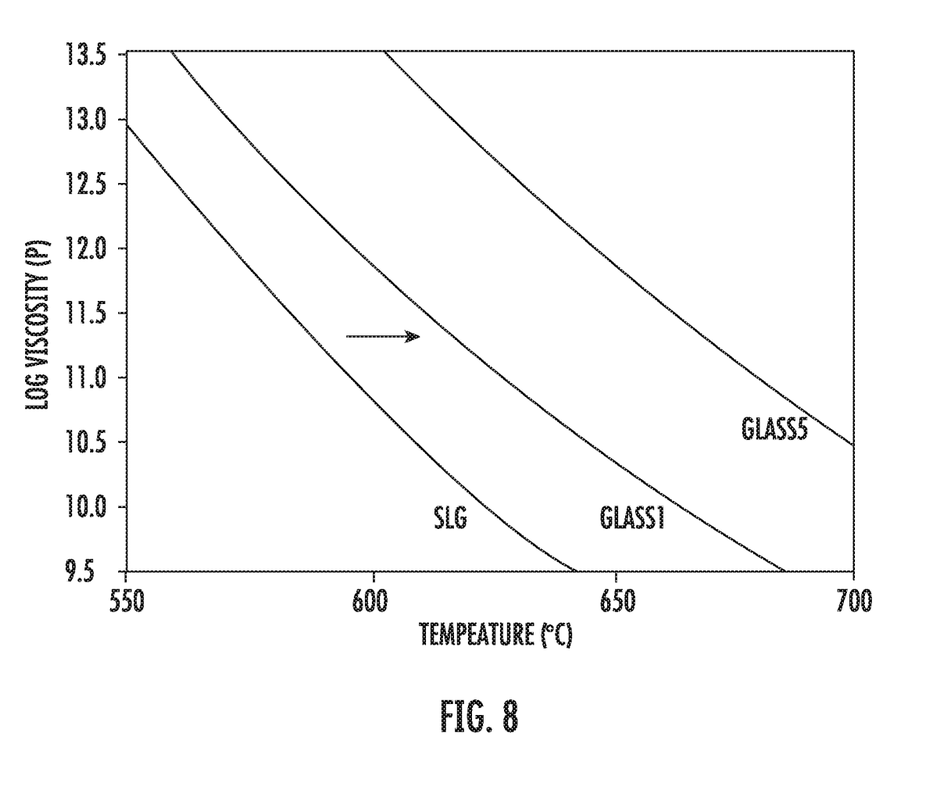
FIG. 8 illustrates a right shift in a viscosity curve for a glass ply by changing the composition from soda lime glass, according to an exemplary embodiment.

As discussed above, the glass ply 12 is selected to match the viscosity curve of the glass ply 14. In general, the glass ply 14 is strengthenable, and by moving the viscosity curve of the glass ply 12 toward the viscosity curve of glass ply 14, which is generally selected for its enhanced mechanical properties, the pair-forming properties of the stack of glass plies 12, 14 are enhanced. In particular, the mechanical properties and economics of chemical strengthening are degraded faster by moving the viscosity curve of the glass ply 14 towards the left than by moving the viscosity curve of the glass ply 12 to the right. FIG. 8 depicts the general concept described herein in which an SLG ply is replaced with a composition (Glass 1) having a viscosity curve shifted further right towards that of a glass composition (Glass 5) having enhanced mechanical properties, especially when such properties are achieved through chemical strengthening.

A variety of glass compositions suitable for use as either glass ply 12 or glass ply 14 are provided in Table 1. Glass 1 is first composition of an alkali aluminosilicate glass. Nominally, Glass 1 has the compositional limits of 63-75 mol % $SiO_2$, 7-13 mol % $Al_2O_3$, 13-24 mol % $R_2O$ (in which R is at least one of Li, Na, or K), and at least one of 0-7 mol % MgO or ZnO. Glass 2 is also an alkali aluminosilicate glass. Nominally, it has the same composition as Glass 1 with the addition of 0.1-1.2 mol % $P_2O_5$. Glass 3 and Glass 4 are phospho aluminoborosilicate glasses generally having the composition of: 65-75 mol % $SiO_2$, 5-15 mol % $Al_2O_3$, 5-15 mol % $B_2O_3$, 1-5 mol % $P_2O_5$, and 1-15 mol % $R_2O$ (in which R is at least one of Li, Na, or K). In comparison, Glass 4 has more $Li_2O$ than Glass 3 but less $B_2O_3$ and $Na_2O$ than Glass 3. Glass 5 is an alkali aluminosilicate glass composition having lower amounts of $Al_2O_3$ and $R_2O$ than Glass 1 and Glass 2. However, Glass 5 contains more MgO and $SiO_2$ than Glass 1 and Glass 2. As can be seen Table 1, various properties of the glass compositions are provided.

With respect to the thermal properties, various viscosity temperatures are given. In particular, $T_{200kP}$, $T_{35kP}$, $T_{400P}$, and $T_{200P}$ refer to the temperatures at which the viscosity of the glass is 200 kP, 35 kP, 400 P, and 200 P, respectively. These temperatures are generally applicable to fusion forming processes. These temperatures are also used to calculate the HTV Fulcher constants found in Table 1. Further, $T_{log9.9}$ (i.e., the temperature at which viscosity is $10^{9.9}$ P) is provided as a reference sagging temperature.

TABLE 1

Exemplary Compositions for Glass Plies 12, 14

| | Glass 1 | Glass 2 | Glass 3 | Glass 4 | Glass 5 |
|---|---|---|---|---|---|
| Composition (mol %) | | | | | |
| $SiO_2$ | 65.89 | 65.28 | 70.5 | 71.1 | 69.2 |
| $Al_2O_3$ | 9.00 | 9.62 | 8.1 | 8.2 | 8.5 |
| $B_2O_3$ | — | — | 9.1 | 8.1 | — |
| $P_2O_5$ | 0.04 | 0.48 | 2.5 | 2.5 | — |
| $Na_2O$ | 16.74 | 16.86 | 6.2 | 5.4 | 13.9 |
| $K_2O$ | 2.46 | 2.10 | — | 0.05 | 1.17 |
| MgO | 3.61 | 2.59 | — | — | 6.4 |
| CaO | — | 0.03 | — | — | 0.5 |
| ZnO | 2.04 | 2.80 | — | — | — |
| $SnO_2$ | 0.21 | 0.22 | 0.13 | 0.06 | 0.19 |
| $Li_2O$ | — | — | 3.4 | 4.5 | — |
| Thermal Properties (° C.) | | | | | |
| Strain Point | 520 | 527 | 475 | 486 | 563 |
| Annealing Point | 566 | 571 | 523 | 536 | 613 |
| Softening Point | 786 | 794 | 788 | 805 | 852 |
| $T_{200kP}$ | 968 | 1014 | 1032 | 1038 | 1046 |
| $T_{35kP}$ | 1062 | 1073 | 1154 | 1160 | 1142 |
| $T_{400P}$ | 1432 | 1448 | 1627 | 1623 | 1527 |
| $T_{200P}$ | 1586 | 1534 | 1715 | 1718 | 1617 |
| $T_{log9.9}$ | 671 | 678 | 650 | 662 | 722 |
| Other Properties | | | | | |
| Liquidus Viscosity (MP) | 11.1 | >8.0 | 1.9 | 1.1 | 2.2 |
| Density (g/cm$^3$) | 2.493 | 2.508 | 2.287 | 2.285 | 2.444 |
| CTE (×10$^{-7}$/° C.) | 99.5 | 97.2 | 54.7 | 53.5 | 84.5 |
| HTV Fulcher | | | | | |
| A | −2.105 | −2.311 | −2.67 | −2.982 | −2.151 |
| B | 6027.7 | 6502.9 | 9250.1 | 10031 | 6306.37 |
| $T_0$ | 151.2 | 124.2 | −128 | −173 | 200 |

Figure 9:
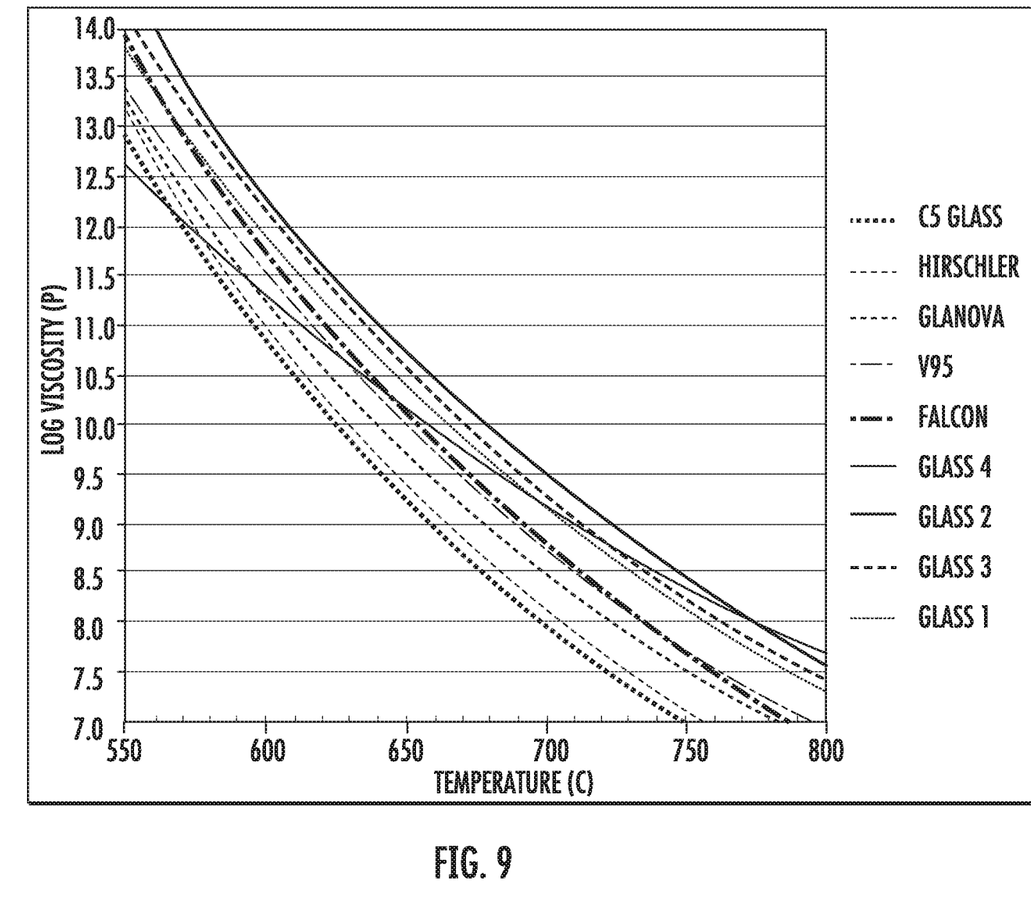
FIG. 9 illustrates viscosity curves for a variety of glass compositions suitable for use in glass plies according to exemplary embodiments as compared to soda lime glass viscosity curves.

Besides Glasses 1-5, other commercial available glasses can also be used as the glass composition for glass plies 12, 14. Exemplary enhanced SLG that are commercially available and have the requisite viscosity properties include: Falcon glass (available from AGC, Inc.), V95 glass (available from Saint Gobain), and Glanova glass (available from Nippon Sheet Glass Co., Ltd). As compared to conventional SLG, enhanced SLG generally include a higher alumina concentration and lower alkali to alumina ratios. FIG. 9 provides the viscosity curves for Glasses 1-4 as well as the V95, Falcon, and Glanova glasses. For comparison purposes, the viscosity curves of two commercially available SLG are provided in FIG. 9. The SLG are C5 glass (available from PGW Auto Glass, LLC) and Hirschler glass (available from Guardian Glass, LLC). The viscosity curves are presented in the range of typical sagging viscosities. As can be seen, the two SLG have the leftmost curves. The glasses usable in embodiments of the present disclosure have viscosity curves that are shifted to the right as compared to the SLG viscosity curves.

Figure 10:
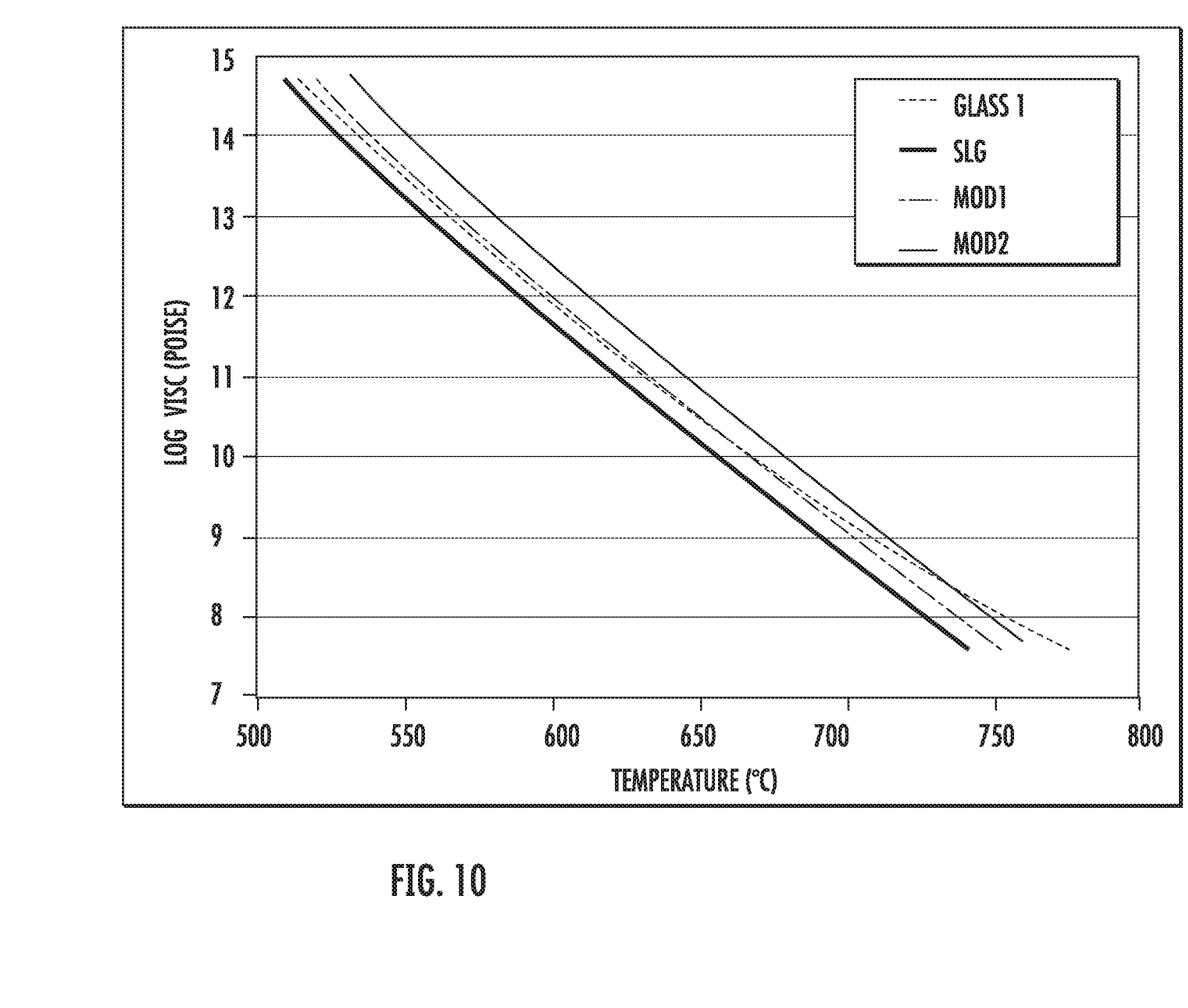
FIG. 10 illustrates the viscosity curves for modified soda lime glass compositions according to exemplary embodiments as compared to a soda lime glass viscosity curve.

Additionally, Table 2, below, provides still further glass compositions that are suitable for use as at least one of glass plies 12, 14. In particular, Table 2 provides compositional data for two modified SLG as well as a composition of SLG provided for reference. As can be seen in comparing Mod1 and Mod2 to SLG, Mod1 and Mod2 include less $SiO_2$ and more $Al_2O_3$ and $Na_2O$. Between Mod1 and Mod2, Mod2 contains less $SiO_2$ and more $Al_2O_3$ than Mod1. This has the effect of further shifting the viscosity curve to the right as shown in FIG. 10. In embodiments, a modified SLG composition includes about 65 to 70 mol % $SiO_2$, about 3 to 10 mol % $Al_2O_3$, about 8 to 18 mol % $R_2O$ (in which R is at least one of Na, K, or Li), about 5 to 15 mol % CaO, and about 3 to 10 mol % MgO. For comparison, FIG. 10 includes the viscosity curve of the SLG having the composition shown in Table 2 and Glass 1 having the composition shown in Table 1.

TABLE 2

Modified SLG compositions

|  | SLG | Mod1 | Mod2 |
| --- | --- | --- | --- |
| Composition (mol %) | | | |
| $SiO_2$ | 70.92 | 68.65 | 66.78 |
| $Al_2O_3$ | 1.06 | 2.99 | 5.00 |
| MgO | 5.84 | 5.86 | 5.62 |
| CaO | 9.26 | 9.17 | 8.90 |
| $Na_2O$ | 12.71 | 13.12 | 13.50 |
| $K_2O$ | 0.21 | 0.21 | 0.2 |
| ZnO | 0 | 0 | 0 |
| $SnO_2$ | 0 | 0 | 0 |
| Properties | | | |
| Density (g/cm³) | 2.469 | 2.503 | 2.513 |
| Coefficient of Thermal Expansion ($\times 10^{-7}$/° C.) | 80.1 | 84.6 | 86.4 |
| Strain Pt (° C.) | 509 | 519 | 532 |
| Anneal Pt (° C.) | 553 | 564 | 576 |
| Softening Pt (° C.) | 740.6 | 750.1 | 761.6 |
| HTV Fulcher | | | |
| A | −1.942 | −1.472 | −1.947 |
| B | 4992.4 | 4195.5 | 4959 |
| $T_0$ | 215.3 | 288.6 | 238.8 |
| $T_{200P}$ (° C.) | 1392 | 1401 | 1406 |
| $T_{35kP}$ (° C.) | 985 | 986 | 1003 |
| $T_{200kP}$ (° C.) | 905 | 908 | 923 |

In embodiments of a laminated article having a relatively thick glass ply 12 and a relatively thin glass ply 14 (as shown in FIG. 1), a variety of combinations of the Glasses 1-5 and commercially available glasses are envisioned. In an embodiment, the thin glass ply 14 (e.g., T2<1.6 mm) is Glass 1, and the thick glass ply 12 (e.g., T1≥1.6 mm) is one of V95 glass, Falcon glass, or Glass 4. In another embodiment, the thin glass ply 14 is Glass 2, and the thick glass ply 12 is Glass 1. Advantageously, Glass 1 provides the best potential Benedictus stress profile (i.e., compressive stress 550 MPa to 750 MPa and DOL of about 40 to about 60 μm) when used as the thick glass ply 12. In another embodiment, the thin glass ply 14 is Glass 1, and the thick glass ply 12 is Glass 2. Advantageously, Glass 2 has higher viscosity than the other glasses discussed herein, which allows for pair-bending of complex shapes with a thicker glass ply 12. In another embodiment, the thin glass ply 14 is Glass 1, and the thick glass ply 12 is Mod1. While the inventors view these embodiments as being promising combinations of glass plies 12, 14, other combinations of glass plies 12, 14 are also possible, including combinations of glass plies 12, 14 having compositions not specifically referenced herein but that meet the thermal properties discussed above with respect to having an anneal point above 550° C. and a softening point above 750° C. and with respect to having a strain point, anneal point, softening point, and/or co-sagging temperature within 35° C. of the glass composition used for the other glass ply 12, 14.

Advantageously, laminate articles made from glass plies 12, 14 as described herein allow for efficient (i.e., high yield and low cost) pair-bending, pair-sagging, or pair-pressing of glasses that have different compositions by selecting glass compositions of substantially similar viscosity curves, especially in the pair-bending regime (i.e., in the viscosity regime between annealing and softening points). In the case where the viscosity curves are relatively well matched, there is a reduced tendency for one ply to experience edge-wrinkling or "bathtub" effects while the other ply remains relatively rigid and less susceptible to deformation by gravity or other forces. Further, when the thicker glass ply 12 of a laminated glass product is more viscous than common SLG, high-quality pair-bent/sagged laminate products that contain an thin glass ply 14 having superior ion-exchange attributes and cost when compared to chem-strenthenable glasses that are intended to have a viscosity curve closer to soda lime glass According to an aspect (1) of the present disclosure, a method for pair bending glass articles is provided. The method comprises: stacking a first glass article and a second glass article to form a stack; placing the stack on a mold; and heating the stack to a sagging temperature such that a shaped stack is formed, wherein the first glass article comprises a first major surface, a second major surface that opposes the first major surface, and a first glass composition comprising a first annealing temperature and a first softening temperature, wherein the second glass article comprises a third major surface, a fourth major surface that opposes the third major surface, and a second glass composition comprising a second annealing temperature and a second softening temperature, wherein the first annealing temperature is within 35° C. of the second annealing temperature and wherein both the first annealing temperature and the second annealing temperature are at least 550° C., wherein the first softening temperature is within 35° C. of the second softening temperature and wherein both the first softening temperature and the second softening temperature are at least 750° C., wherein the second major surface faces the third major surface in the stack, and wherein the sagging temperature is above both of the first annealing temperature and the second annealing temperature.

According to an aspect (2) of the present disclosure, the method of aspect (1) is provided, wherein the first glass article comprises a first thickness between the first major surface and the second major surface and the second glass article comprises a second thickness between the third major surface and the fourth major surface, and wherein the first thickness is different from the second thickness.

According to an aspect (3) of the present disclosure, the method of aspect (2) is provided, wherein the first thickness is less than 1.6 mm and the second thickness is at least 1.6 mm.

According to an aspect (4) of the present disclosure, the method of any of aspects (1)-(3) is provided, wherein at least one of the first glass composition or the second glass composition is an alkali aluminosilicate glass comprising from about 63 mol % to about 75 mol % $SiO_2$, from about 7 mol % to about 13 mol % $Al_2O_3$, and from about 13 mol % to about 24 mol % of $R_2O$, wherein R is at least one of Li, Na, or K.

According to an aspect (5) of the present disclosure, the method of aspect (4) is provided, wherein the alkali aluminosilicate glass further comprises from about 0.1 mol % to about 1.2 mol % $P_2O_5$.

According to an aspect (6) of the present disclosure, the method of any of aspects (1)-(3) is provided, wherein at least one of the first glass composition or the second glass composition is an aluminoborosilicate glass comprising from about 65 mol % to about 75 mol % $SiO_2$, from about 5 mol % to about 15 mol % $Al_2O_3$, from about 5 mol % to about 15 mol % $B_2O_3$, from about 1 mol % to about 5 mol % $P_2O_5$, and from about 1 mol % to about 15 mol % $R_2O$, wherein R is at least one of Li, Na, or K.

According to an aspect (7) of the present disclosure, the method of any of aspects (1)-(6) is provided, wherein the second glass composition comprises a modified soda lime glass comprising less than about 70 mol % of $SiO_2$, at least about mol % of $Na_2O$, and at least about 3 mol % of $Al_2O_3$.

According to an aspect (8) of the present disclosure, the method of any of aspects (1)-(7) is provided, wherein the second glass composition comprises an enhanced soda lime glass.

According to an aspect (9) of the present disclosure, the method of any of aspects (1)-(7) is provided, wherein the first glass composition is different from the second glass composition.

According to an aspect (10) of the present disclosure, the method of any of aspects (1)-(6) is provided, wherein the first glass composition is the same as the second glass composition.

According to an aspect (11) of the present disclosure, the method of any of aspects (1)-(10) is provided, wherein the first annealing temperature is within 25° C. of the second annealing temperature.

According to an aspect (12) of the present disclosure, the method of any of aspects (1)-(11) is provided, wherein the first softening temperature is within 25° C. of the second softening temperature.

According to an aspect (13) of the present disclosure, the method of any of aspects (1)-(12) is provided, wherein the first glass composition further comprises a first strain temperature and the second glass composition further comprises a second strain temperature and wherein the first strain temperature is within 35° C. of the second strain temperature.

According to an aspect (14) of the present disclosure, the method of any of aspects (1)-(13) is provided, wherein at least one of the first glass article or the second glass article is chemically strengthened.

According to an aspect (15) of the present disclosure, the method of any of aspects (1)-(14) is provided, wherein both the first glass article and the second glass article are chemically strengthened.

According to an aspect (16) of the present disclosure, the method of any of aspects (1)-(15) is provided, wherein the first glass composition and the second glass composition each further comprise a temperature (° C.) at a viscosity of $10^{12}$ poise ($T_{log12}$) that is at least 575° C.

According to an aspect (17) of the present disclosure, the method of aspect (16) is provided, wherein the $T_{log12}$ for the first glass composition is within 35° C. of the $T_{log12}$ for the second glass composition.

According to an aspect (18) of the present disclosure, the method of any of aspects (1)-(17) is provided, wherein the shaped stack comprises a gap between the second major surface and the third major surface having a maximum distance of about 10 mm or less.

According to an aspect (19) of the present disclosure, the method of aspect (18) is provided, wherein the maximum distance is about 5 mm or less.

According to an aspect (20) of the present disclosure, the method of aspect (18) is provided, wherein the maximum distance is about 3 mm or less.

According to an aspect (21) of the present disclosure, a laminate is provided. The laminate comprises: a first curved glass layer comprising a first major surface, a second major surface opposing the first major surface, a first thickness defined as the distance between the first major surface and second major surface, and a first sag depth of about 2 mm or greater, the first curved glass layer comprising a first glass composition comprising a first annealing temperature and a first softening temperature; a second curved glass layer comprising a third major surface, a fourth major surface opposing the third major surface, a second thickness defined as the distance between the third major surface and the fourth major surface, and a second sag depth of about 2 mm or greater, the second curved glass layer comprising a second glass composition comprising a second annealing temperature and a second softening temperature; and an interlayer disposed between the second major surface of the first curved glass layer and the third major surface of the second curved glass layer, wherein the first annealing temperature is within 35° C. of the second annealing temperature and wherein the first annealing temperature and the second annealing temperature are both above 550° C., wherein the first softening temperature is within 35° C. of the second softening temperature and wherein the first softening temperature and the second softening temperature are both above 750° C., and wherein at least one of the first curved glass layer or the second curved glass layer is strengthened.

According to an aspect (22) of the present disclosure, the laminate of aspect (21) is provided, wherein at least one of the first glass composition or the second glass composition comprises an alkali aluminosilicate glass comprising from about 63 mol % to about 75 mol % $SiO_2$, about 7 mol % to about 13 mol % $Al_2O_3$, and about 13 mol % to about 24 mol % of $R_2O$, wherein R is at least one of Li, Na, or K.

According to an aspect (23) of the present disclosure, the laminate of aspect (22) is provided, wherein the alkali aluminosilicate glass further comprises from about 0.1 mol % to about 1.2 mol % $P_2O_5$.

According to an aspect (24) of the present disclosure, the laminate of aspect (21) is provided, wherein at least one of the first glass composition and the second glass composition comprises an aluminoborosilicate glass comprising about 65 mol % to about 75 mol % $SiO_2$, about 5 mol % to about 15 mol % $Al_2O_3$, about 5 mol % to about 15 mol % $B_2O_3$, about 1 mol % to about 5 mol % $P_2O_5$, and about 1 mol % to about 15 mol % $R_2O$, wherein R is at least one of Li, Na, or K.

According to an aspect (25) of the present disclosure, the laminate of aspect (21) is provided, wherein at least one of the first glass composition or the second glass composition comprises a modified soda lime glass comprising less than about 70 mol % of $SiO_2$, at least about 13 mol % of $Na_2O$, and at least about 3 mol % of $Al_2O_3$.

According to an aspect (26) of the present disclosure, the laminate of aspect (21) is provided, wherein at least one of the first glass composition or the second glass composition comprises an enhanced soda lime glass.

According to an aspect (27) of the present disclosure, the laminate of any of aspects (21)-(26) is provided, wherein the first glass composition is different from the second glass composition.

According to an aspect (28) of the present disclosure, the laminate of any of aspects (21)-(26) is provided, wherein the first glass composition is the same as the second glass composition.

According to an aspect (29) of the present disclosure, the laminate of any of aspects (21)-(28) is provided, wherein one of the first curved glass layer and the second curved glass layer is strengthened.

According to an aspect (30) of the present disclosure, the laminate of any of aspects (21)-(28) is provided, wherein both of the first curved glass layer and the second curved glass layer are strengthened.

According to an aspect (31) of the present disclosure, the laminate of any of aspects (21)-(30) is provided, wherein the first annealing temperature is within 25° C. of the second annealing temperature.

According to an aspect (32) of the present disclosure, the laminate of any of aspects (21)-(31) is provided, wherein the first softening temperature is within 25° C. of the second softening temperature.

According to an aspect (33) of the present disclosure, the laminate of any of aspects (21)-(32) is provided, wherein the first glass composition further comprises a first strain temperature and the second glass composition further comprises a second strain temperature and wherein the first strain temperature is within 35° C. of the second strain temperature.

According to an aspect (34) of the present disclosure, the laminate of any of aspects (21)-(33) is provided, wherein the first glass composition and the second glass composition each comprise a temperature (° C.) at a viscosity of $10^{12}$ poise ($T_{log12}$) that is at least about 575° C.

According to an aspect (35) of the present disclosure, the laminate of aspect (34) is provided, wherein the $T_{log12}$ for the first glass composition is within 35° C. of the $T_{log12}$ for the second glass composition.

According to an aspect (36) of the present disclosure, the laminate of any of aspects (21)-(35) is provided, wherein one of or both the first major surface and the fourth major surface comprises an optical distortion of less than 200 millidiopters as measured by an optical distortion detector using transmission optics according to ASTM 1561.

According to an aspect (37) of the present disclosure, the laminate of any of aspects (21)-(36) is provided, wherein the third major surface or the fourth major surface comprises a membrane tensile stress of less than 7 MPa as measured by a surface stressmeter, according to ASTM C1279.

According to an aspect (38) of the present disclosure, the laminate of any of aspects (21)-(37) is provided, wherein the first thickness is less than 1.6 mm and the second thickness is at least 1.6 mm.

According to an aspect (39) of the present disclosure, the laminate of any of aspects (21)-(38) is provided, wherein the first thickness is at least about 0.1 mm and the second thickness is less than about 3.0 mm.

According to an aspect (40) of the present disclosure, the laminate of any of aspects (21)-(39) is provided, wherein the first sag depth is within 10% of the second sag depth and a shape deviation between the first glass layer and the second glass layer of ±5 mm or less as measured by an optical three-dimensional scanner.

According to an aspect (41) of the present disclosure, the laminate of aspect (40) is provided, wherein the shape deviation is about ±1 mm or less.

According to an aspect (42) of the present disclosure, the laminate of aspect (40) is provided, wherein the shape deviation is about ±0.5 mm or less.

According to an aspect (43) of the present disclosure, the laminate of any of aspects (21)-(42) is provided, wherein the first sag depth is in a range from +/− about 5 mm to about 30 mm.

According to an aspect (44) of the present disclosure, the laminate of any of aspects (21)-(43) is provided, wherein the first curved glass layer comprises a first length and a first width, wherein either one of or both of the first length and the first width is about 0.25 meters or greater.

According to an aspect (45) of the present disclosure, the laminate of aspect (44) is provided, wherein the first curved glass layer comprises a first length, and a first width, and the second curved glass layer comprises a second length that is within 5% of the first length and a second width that is within 5% of the first width.

According to an aspect (46) of the present disclosure, a vehicle is provided. The vehicle comprises: a body defining an interior and an opening in communication with the interior; and the laminate of any one of aspects (21)-(45) disposed in the opening.

According to an aspect (47) of the present disclosure, a laminate is provided. The laminate comprises: a first glass layer comprising a first major surface, a second major surface opposing the first major surface, a first thickness defined as the distance between the first major surface and second major surface, the first curved glass layer comprising a first glass composition comprising a first annealing temperature ($AT_1$) and a first softening temperature ($ST_1$); a second glass layer comprising a third major surface, a fourth major surface opposing the third major surface, a second thickness defined as the distance between the third major surface and the fourth major surface, the second curved glass layer comprising a second glass composition comprising a second annealing temperature ($AT_2$) and a second softening temperature ($ST_2$); and an interlayer disposed between the second major surface of the first curved glass layer and the third major surface of the second curved glass layer, wherein ($AT_1+ST_1$)/2 is within 35° C. of ($AT_2+ST_2$)/2, wherein the first curved glass layer is ion-exchange strengthened, and wherein the first thickness is less than the second thickness.

According to an aspect (48) of the present disclosure, the laminate of aspect (47) is provided, wherein the second glass layer is not strengthened.

According to an aspect (49) of the present disclosure, the laminate of any of aspects (47)-(48) is provided, wherein the first glass composition is different from the second glass composition.

According to an aspect (50) of the present disclosure, the laminate of any of aspects (47)-(48) is provided, wherein the first glass composition is the same as the second glass composition.

According to an aspect (51) of the present disclosure, a laminate is provided. The laminate comprises: a first glass layer comprising a first major surface, a second major surface opposing the first major surface, a first thickness defined as the distance between the first major surface and second major surface, the first curved glass layer comprising a first glass composition comprising a first annealing temperature ($AT_1$) and a first softening temperature ($ST_1$); a second glass layer comprising a third major surface, a fourth major surface opposing the third major surface, a second thickness defined as the distance between the third major surface and the fourth major surface, the second curved glass layer comprising a second glass composition comprising a second annealing temperature ($AT_2$) and a second softening temperature ($ST_2$); and an interlayer disposed between the second major surface of the first curved glass layer and the third major surface of the second curved glass layer, wherein $(AT_1+ST_1)/2$ is within 35° C. of $(AT_2+ST_2)/2$, wherein both the first curved glass layer and the second curved glass layer are ion-exchange strengthened, and wherein the first thickness is less than the second thickness.

According to an aspect (52) of the present disclosure, the laminate of aspect (51) is provided, wherein the first glass composition is different from the second glass composition.

According to an aspect (53) of the present disclosure, the laminate of aspect (51) is provided, wherein the first glass composition is the same as the second glass composition.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A laminate comprising:
    a first curved glass layer comprising a first major surface, a second major surface opposing the first major surface, a first thickness defined as the distance between the first major surface and second major surface, and a first sag depth of about 2 mm or greater, the first curved glass layer comprising a first glass composition comprising a first annealing temperature and a first softening temperature;
    a second curved glass layer comprising a third major surface, a fourth major surface opposing the third major surface, a second thickness defined as the distance between the third major surface and the fourth major surface, and a second sag depth of about 2 mm or greater, the second curved glass layer comprising a second glass composition comprising a second annealing temperature and a second softening temperature, the second glass composition being different than the first glass composition; and
    an interlayer disposed between the second major surface of the first curved glass layer and the third major surface of the second curved glass layer,
    wherein the second glass composition comprises from 65 to 70 mol % $SiO_2$, from 3 to 10 mol % $Al_2O_3$, from 8 to 18 mol % $R_2O$ (in which R is at least one of Na, K, or Li), from 5 to 15 mol % CaO, and from 3 to 10 mol % MgO,
    wherein the first annealing temperature is within 35° C. of the second annealing temperature and wherein the first annealing temperature and the second annealing temperature are both above 550° C.,
    wherein the first softening temperature is within 35° C. of the second softening temperature and wherein the first softening temperature and the second softening temperature are both above 750° C.,
    wherein at least one of the first curved glass layer or the second curved glass layer is strengthened, and
    wherein the first thickness is less than 1.6 mm and the second thickness is at least 2.5 mm.

2. The laminate of claim 1, wherein at least one of the first glass composition comprises an alkali aluminosilicate glass comprising from about 63 mol % to about 75 mol % $SiO_2$, about 7 mol % to about 13 mol % $Al_2O_3$, and about 13 mol % to about 24 mol % of $R_2O$, wherein R is at least one of Li, Na, or K.

3. The laminate of claim 2, wherein the alkali aluminosilicate glass further comprises from about 0.1 mol % to about 1.2 mol % $P_2O_5$.

4. The laminate of claim 1, wherein at least one of the first glass composition comprises an aluminoborosilicate glass comprising about 65 mol % to about 75 mol % $SiO_2$, about 5 mol % to about 15 mol % $Al_2O_3$, about 5 mol % to about 15 mol % $B_2O_3$, about 1 mol % to about 5 mol % $P_2O_5$, and about 1 mol % to about 15 mol % $R_2O$, wherein R is at least one of Li, Na, or K.

5. The laminate of claim 1, wherein the first glass composition comprises a modified soda lime glass comprising less than about 70 mol % of $SiO_2$, at least about 13 mol % of $Na_2O$, and at least about 3 mol % of $Al_2O_3$.

6. The laminate of claim 1, wherein the first glass composition further comprises a first strain temperature and the second glass composition further comprises a second strain temperature and wherein the first strain temperature is within 35° C. of the second strain temperature.

7. The laminate of claim 1, wherein the first glass composition and the second glass composition each comprise a temperature (° C.) at a viscosity of $10^{12}$ poise ($T_{log12}$) that is at least about 575° C.

8. The laminate of claim 7, wherein the $T_{log12}$ for the first glass composition is within 35° C. of the $T_{log12}$ for the second glass composition.

9. The laminate of claim 1, wherein one of or both the first major surface and the fourth major surface comprises an optical distortion of less than 200 millidiopters as measured by an optical distortion detector using transmission optics according to ASTM 1561.

10. The laminate of claim 1, wherein the third major surface or the fourth major surface comprises a membrane tensile stress of less than 7 MPa as measured by a surface stressmeter, according to ASTM C1279.

11. The laminate of claim 1, wherein the first thickness is at least about 0.1 mm and the second thickness is less than about 3.0 mm.

12. The laminate of claim 1, wherein the first sag depth is within 10% of the second sag depth and a shape deviation between the first glass layer and the second glass layer is #5 mm or less as measured by an optical three-dimensional scanner.

13. The laminate of claim 12, wherein the shape deviation is about +1 mm or less.

14. The laminate of claim 1, wherein the first sag depth is in a range from +/−about 5 mm to about 30 mm.

15. The laminate of claim 1, wherein the first curved glass layer comprises a first length and a first width, and either one of or both of the first length and the first width is about 0.25 meters or greater.

16. The laminate of claim 15, wherein the first curved glass layer comprises a first length and a first width, and the second curved glass layer comprises a second length that is within 5% of the first length and a second width that is within 5% of the first width.

17. A vehicle comprising:
a body defining an interior and an opening in communication with the interior; and
the laminate of claim 1 disposed in the opening.

18. A laminate comprising:
a first curved glass layer comprising a first major surface, a second major surface opposing the first major surface, a first thickness defined as the distance between the first major surface and second major surface, the first curved glass layer comprising a first glass composition comprising a first annealing temperature ($AT_1$) and a first softening temperature ($ST_1$);
a second curved glass layer comprising a third major surface, a fourth major surface opposing the third major surface, a second thickness defined as the distance between the third major surface and the fourth major surface, the second curved glass layer comprising a second glass composition comprising a second annealing temperature ($AT_2$) and a second softening temperature ($ST_2$), the second glass composition being different than the first glass composition; and
an interlayer disposed between the second major surface of the first curved glass layer and the third major surface of the second curved glass layer,
wherein $(AT_1+ST_1)/2$ is within 35° C. of $(AT_2+ST_2)/2$,
wherein the second glass composition comprises from 65 to 70 mol % $SiO_2$, from 3 to 10 mol % $Al_2O_3$, from 8 to 18 mol % $R_2O$ (in which R is at least one of Na, K, or Li), from 5 to 15 mol % CaO, and from 3 to 10 mol % MgO,
wherein the first curved glass layer is ion-exchange strengthened,
wherein the first thickness is less than the second thickness,
wherein the first thickness is less than 1.6 mm and the second thickness is at least 2.5 mm,
wherein $AT_1$ and $AT_2$ are each at least 550° C.

19. The laminate of claim 18, wherein the second curved glass layer is not strengthened.

20. A method for pair bending glass articles, the method comprising:
stacking a first glass article and a second glass article to form a stack;
placing the stack on a mold; and
heating the stack to a sagging temperature such that a shaped stack is formed,
wherein the first glass article comprises a first major surface, a second major surface that opposes the first major surface, and a first glass composition comprising a first annealing temperature and a first softening temperature,
wherein the second glass article comprises a third major surface, a fourth major surface that opposes the third major surface, and a second glass composition comprising a second annealing temperature and a second softening temperature, the second glass composition being different from the first glass composition,
wherein the second glass composition comprises from 65 to 70 mol % $SiO_2$, from 3 to 10 mol % $Al_2O_3$, from 8 to 18 mol % $R_2O$ (in which R is at least one of Na, K, or Li), from 5 to 15 mol % CaO, and from 3 to 10 mol % MgO,
wherein the first annealing temperature is within 35° C. of the second annealing temperature and wherein both the first annealing temperature and the second annealing temperature are at least 550° C.,
wherein the first softening temperature is within 35° C. of the second softening temperature and wherein both the first softening temperature and the second softening temperature are at least 750° C.,
wherein the second major surface faces the third major surface in the stack, and
wherein the sagging temperature is above both of the first annealing temperature and the second annealing temperature,
wherein the first glass article comprises a first thickness between the first major surface and the second major surface and the second glass article comprises a second thickness between the third major surface and the fourth major surface, and
wherein the first thickness is less than 1.6 mm and the second thickness is at least 2.5 mm.

21. The method of claim 20, wherein the first glass composition or the second glass composition is an alkali aluminosilicate glass comprising from about 63 mol % to about 75 mol % $SiO_2$, from about 7 mol % to about 13 mol % $Al_2O_3$, and from about 13 mol % to about 24 mol % of $R_2O$, wherein R is at least one of Li, Na, or K.

22. The method of claim 21, wherein the alkali aluminosilicate glass further comprises from about 0.1 mol % to about 1.2 mol % $P_2O_5$.

23. The method of claim 20, wherein the first glass composition is an aluminoborosilicate glass comprising from about 65 mol % to about 75 mol % $SiO_2$, from about 5 mol % to about 15 mol % $Al_2O_3$, from about 5 mol % to about 15 mol % $B_2O_3$, from about 1 mol % to about 5 mol % $P_2O_5$, and from about 1 mol % to about 15 mol % $R_2O$, wherein R is at least one of Li, Na, or K.

24. The method of claim 20, wherein the first glass composition further comprises a first strain temperature and the second glass composition further comprises a second strain temperature and wherein the first strain temperature is within 35° C. of the second strain temperature.

25. The method of claim 20, wherein at least one of the first glass article or the second glass article is chemically strengthened.

26. The method of claim 20, wherein the first glass composition and the second glass composition each further comprise a temperature (° C.) at a viscosity of $10^{12}$ poise ($T_{log12}$) that is at least 575° C.

27. The method of claim 26, wherein the $T_{log12}$ for the first glass composition is within 35° C. of the $T_{log12}$ for the second glass composition.

28. The method of claim 20, wherein the shaped stack comprises a gap between the second major surface and the third major surface having a maximum distance of about 10 mm or less.

* * * * *